(12) United States Patent
Mannami

(10) Patent No.: US 12,450,445 B2
(45) Date of Patent: Oct. 21, 2025

(54) TRANSLATION COMMUNICATION DEVICE AND TRANSLATION COMMUNICATION METHOD THAT PERFORM VOICE TRANSLATION IN GROUP COMMUNICATION

(71) Applicant: JVCKENWOOD Corporation, Yokohama (JP)

(72) Inventor: Kazuki Mannami, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 215 days.

(21) Appl. No.: 18/472,311

(22) Filed: Sep. 22, 2023

(65) Prior Publication Data

US 2024/0013010 A1    Jan. 11, 2024

Related U.S. Application Data

(63) Continuation of application No. PCT/JP2022/002369, filed on Jan. 24, 2022.

(30) Foreign Application Priority Data

Mar. 24, 2021  (JP) ................. 2021-050643

(51) Int. Cl.
G10L 15/26    (2006.01)
G06F 40/58    (2020.01)
G10L 21/043   (2013.01)

(52) U.S. Cl.
CPC .............. *G06F 40/58* (2020.01); *G10L 15/26* (2013.01); *G10L 21/043* (2013.01)

(58) Field of Classification Search
None
See application file for complete search history.

(56) References Cited

U.S. PATENT DOCUMENTS

2006/0130007 A1* 6/2006 Ackerman ......... G09B 19/0053
717/136
2014/0067398 A1* 3/2014 Verna .................. G10L 13/00
704/260

(Continued)

FOREIGN PATENT DOCUMENTS

JP    H08-102790 A    4/1996
JP    2005-079852 A   3/2005

OTHER PUBLICATIONS

International Search Report for the corresponding PCT Application No. PCT/JP2022/002369 mailed Apr. 19, 2022, 4 pages.

(Continued)

*Primary Examiner* — Neeraj Sharma
(74) *Attorney, Agent, or Firm* — Shih IP Law Group, PLLC

(57) ABSTRACT

In a transmitter, a translation processing unit generates a translation voice from an original language voice to generate a text data from the translation voice. A slot control unit allocates the original language voice and the translation voice to different time slots to generate a slot language information indicating a type of language allocated to each time slot. A communication unit performs a transmission of the original language voice and the translation voice using the time slots allocated to each and a transmission of the slot language information. The slot control unit regenerates the slot language information that the time slot used for the original language voice is designated as the time slot for the text data. The communication unit performs a transmission of the text data and the translation voice using different time slots and a transmission of the regenerated slot language information.

6 Claims, 16 Drawing Sheets

(56) References Cited

U.S. PATENT DOCUMENTS

| | | | | |
|---|---|---|---|---|
| 2014/0358518 | A1* | 12/2014 | Wu | G06F 40/47 |
| | | | | 704/3 |
| 2016/0034447 | A1* | 2/2016 | Shin | G06Q 10/107 |
| | | | | 704/3 |
| 2016/0267074 | A1* | 9/2016 | Nozue | G06F 40/123 |
| 2018/0018325 | A1* | 1/2018 | Fukuoka | G10L 15/22 |
| 2018/0299960 | A1* | 10/2018 | Knott | G06N 3/084 |
| 2019/0005958 | A1* | 1/2019 | Ishikawa | G06F 3/04883 |
| 2019/0138605 | A1* | 5/2019 | Black | G06F 40/58 |
| 2020/0272699 | A1* | 8/2020 | Sridhara | G06F 40/40 |
| 2021/0358489 | A1* | 11/2021 | Hussain | G10L 15/083 |

OTHER PUBLICATIONS

International Preliminary Examination Report on Patentability (I) for the corresponding PCT Application No. PCT/JP2022/002369 mailed Sep. 12, 2023, 12 pages.

\* cited by examiner

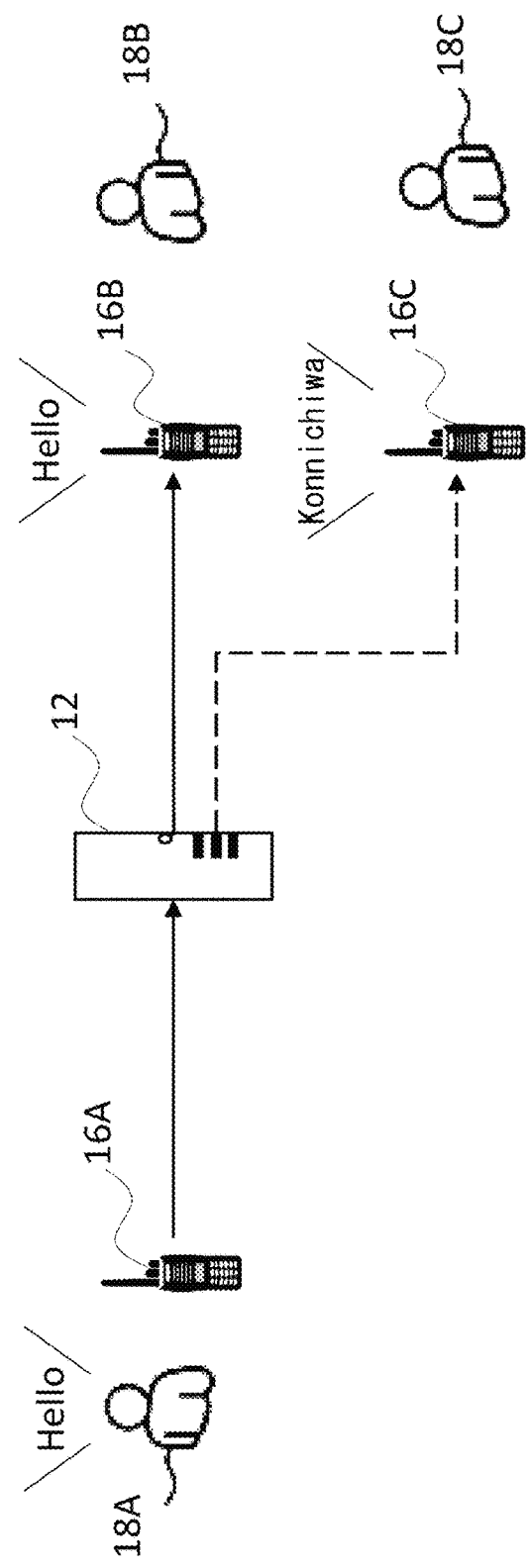

FIG.5

| List No. | MOBILE TERMINAL NAME | INDIVIDUAL ID | GROUP ID | USAGE LANGUAGE |
|---|---|---|---|---|
| 1 | A | 1 | 10 | English |
| 2 | B | 2 | 10 | English |
| 3 | C | 3 | 10 | Japanese |
| 4 | ... | ... | ... | ... | ns # TRANSLATION COMMUNICATION DEVICE AND TRANSLATION COMMUNICATION METHOD THAT PERFORM VOICE TRANSLATION IN GROUP COMMUNICATION

CROSS-REFERENCE TO RELATED APPLICATION

This application is a continuation of application No. PCT/JP2022/002369, and claims the benefit of priority from the prior Japanese Patent Application No. 2021-50643, filed on Mar. 24, 2021, the entire contents of which is incorporated herein by reference.

BACKGROUND

1. Field of the Invention

The invention relates to a translation communication device and a translation communication method.

2. Description of the Related Art

A translation communication system has been developed in which a translation device translates voice sent in different languages from each terminal device to send it to other terminal devices in a group communication in which a call is made between multiple terminal devices. For example, Patent literature 1 describes a translation communication system that can switch between an original language and a translated language in a voice call. In the translation communication system disclosed in Patent literature 1, a callee's cell phone receives an original language voice data by a first time slot and a translation voice data by a second time slot. Either the original language voice data or the translation voice data is selected by a user operation. The voice is output from a speaker.

[Patent Literature 1] JP2005-79852

In the translation communication system, as a calling mobile terminal switches to another mobile terminal, a content of a time slot may switch to data in a language different from the language that is previously spoken. In this case, in the conventional translation communication system as described above, the user must select the time slot in accordance with the language switch in order to output the desired time slot data at a called mobile terminal. This has caused an issue with the time and effort required.

SUMMARY

A transmitter according to one embodiment comprises: a translation processing unit configured to generate a translation voice from an original language voice to generate a text data from the generated translation voice; a slot control unit configured to allocate the original language voice and the translation voice to different time slots to generate a slot language information indicating a type of language allocated to each time slot; and a communication unit configured to perform a transmission of the original language voice and the translation voice using the time slots allocated to each and a transmission of the slot language information, wherein the slot control unit regenerates the slot language information that the time slot used for the original language voice is designated as the time slot for the text data, and wherein the communication unit performs a transmission of the text data and the translation voice using different time slots and a transmission of the regenerated slot language information.

A receiver according to another embodiment comprises: a storage configured to store information for a preset usage language; a communication unit configured to receive an original language voice allocated to different time slots, a translation voice of the original language voice, and a slot language information indicating a type of language allocated to each time slot; and a selection unit configured to select the time slot corresponding to the preset usage language information based on the slot language information, wherein the communication unit receives the text data of the translation voice and the translation voice in different time slots, and receives the slot language information regenerated such that the time slot used for the original language voice is designated as the time slot for the text data of the translation voice, and wherein the selection unit selects the time slot for the text data and the translation voice based on the regenerated slot language information.

Any combination of the above components or any substitution of the components or expressions of the invention among methods, devices, systems, etc., is also valid as a form of the invention.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which:

FIGS. 2A-2B show an overview of voice translation communication in the translation communication system of FIG. 1;

FIG. 5 shows an example of a terminal management table in FIG. 4;

DETAILED DESCRIPTION

The invention will now be described by reference to the preferred embodiments. This does not intend to limit the scope of the present invention, but to exemplify the invention.

The following is a description of the embodiment of the present invention with reference to the drawings. In this specification and the drawings, elements having substantially the same functions and configuration are omitted from duplicated explanations by attaching the same symbols, and elements not directly related to the present invention are omitted from the illustrations.

First Embodiment

Figure 1:
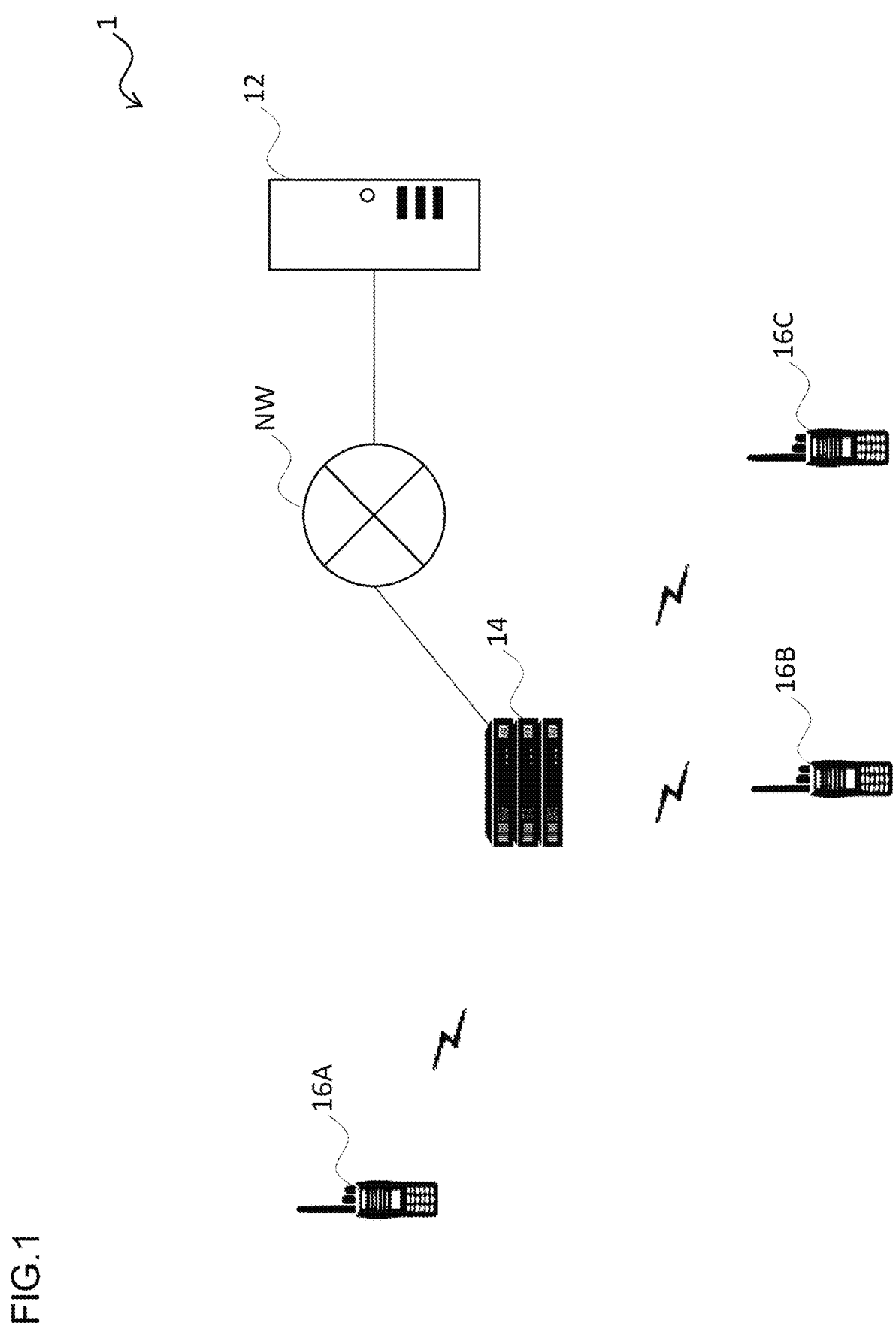
FIG. 1 shows a schematic diagram of a translation communication system.

FIG. 1 schematically illustrates a translation communication system 1 in the present embodiment. The translation communication system 1 includes a management device 12 or transmitter, a relay station 14, and three first to third mobile terminals 16A to 16C, which may be collectively referred to as mobile terminals 16 or receivers. The management device 12 and mobile terminals 16 are connected to each other via the relay station 14 and a communication network NW. The communication network NW is, for example, an IP (Internet Protocol) network. In the example of FIG. 1, only one relay station 14 is shown for the sake of simplicity. However, two or more relay stations may be provided. Similarly, in the example in FIG. 1, three mobile terminals 16A-16C are shown. However, more than two mobile terminals 16 should be provided. The mobile terminal 16 of the present embodiment is an example of a terminal device.

The translation communication system 1 has one or more call channels. Communication in the translation communication system 1 is performed using the time division multiple access (TDMA) method. In particular, the translation communication system 1 uses different frequencies for a downlink and an uplink. The uplink and downlink have multiple time slots that are time-division multiplexed, respectively. In the present embodiment, the uplink and downlink have two time slots, a first time slot and a second time slot, respectively.

The mobile terminal 16, also called an IP transceiver or a Push-to-Talk over Cellular (PoC) transceiver, performs a voice communication. The voice communication is a push-to-talk system. The mobile terminal 16 can also perform individual calls, group calls, and simultaneous calls. To perform such voice communications, the mobile terminal 16 is connected to the relay station 14. In the present embodiment, a half-duplex communication is used as the communication method between the relay station 14 and the mobile terminal 16. The management device 12 performs the sequence processing when making a call between the mobile terminals 16. The management device 12 in the present embodiment also has a voice translation function.

In this configuration, a user of the mobile terminal 16 performs a voice call with another user using another mobile terminal 16 by pressing a call button on the mobile terminal 16. In the half-duplex communication, the other users cannot speak even if they press the call button, while one of the users presses the call button to speak in multiple mobile terminals 16 for a certain voice call.

Figure 2B:
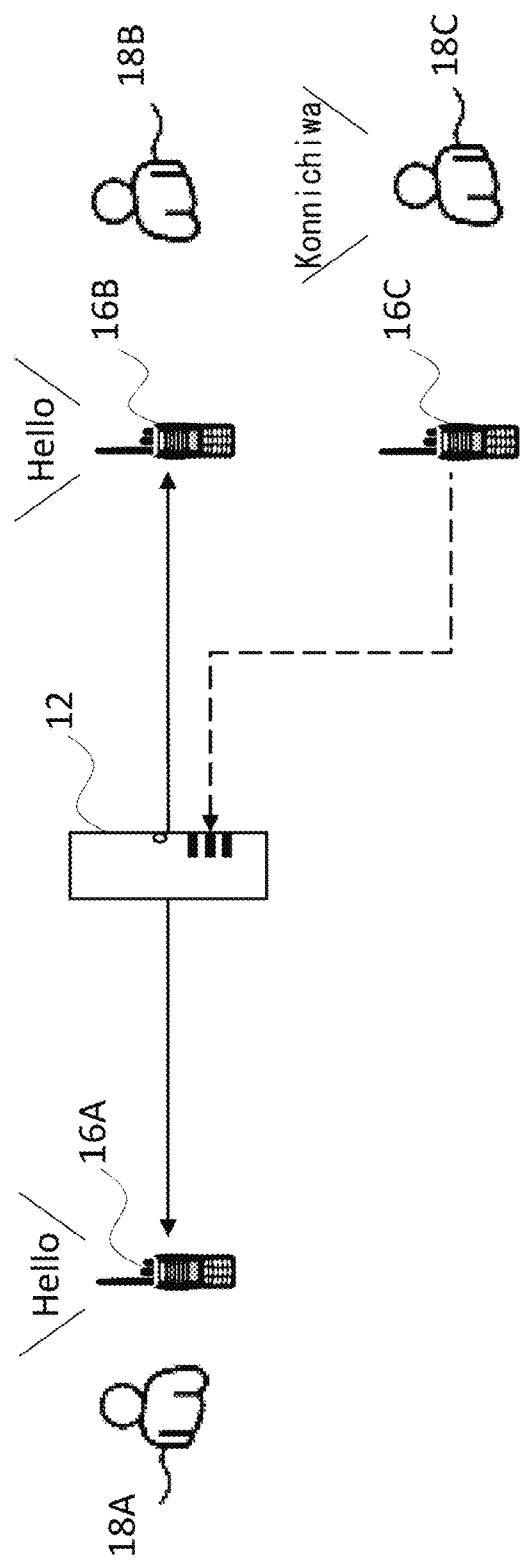

FIGS. 2A and 2B show an overview of voice translation communication in the translation communication system 1. Here, communication between three mobile terminals 16A to 16C, i.e., first to third mobile terminals 16A to 16C, is assumed. The first mobile terminal 16A is used for a first user 18A. The second mobile terminal 16B is used for a second user 18B. The third mobile terminal 16C is used for a third user 18C. The first through third users 18A-18C may be collectively referred to as users 18. FIG. 2A shows an example of communication when the first user 18A is pressing the call button on the first mobile terminal 16A. FIG. 2B shows an example of communication when the third user 18C is pressing the call button of the third mobile terminal 16C. The communication between each mobile terminal 16 and the management device 12 is performed via the relay station 14. However, the relay station 14 is omitted in FIGS. 2A and 2B to facilitate the explanation.

As shown in FIG. 2A, the original language voice is transmitted from the first mobile terminal 16A to the management unit 12 using the uplink frequency when the first user 18A speaks English, for example, "Hello". The management device 12 has information on a language used by each mobile terminal 16 registered in advance. For example, the management unit 12 registers the language used by the first and second mobile terminals 16A and 16B as English, and the language used by the third mobile terminal 16C as Japanese. The management unit 12 performs a translation processing to translate the received English original language voice into Japanese, the language used by the third mobile terminal 16C. The management unit 12 transmits the English original language voice and the translated Japanese voice to the second and third mobile terminals 16B and 16C using the downlink frequency in different time slots. The second mobile terminal 16B selects a time slot in the downlink that uses the original language voice by English of its own language to play the original language voice by English to output the "Hello" voice. The third mobile terminal 16C selects a time slot in the downlink that uses the translated voice by Japanese of its own language to play the Japanese translation to output the Japanese translation of "Hello" as "Konnichiwa". In this case, the start timing and the end timing of the transmission of the translation voice in Japanese at the third mobile terminal 16C will be delayed compared to the start timing and the end timing of the transmission of the original language voice at the second mobile terminal 16B, since translation takes time.

As shown in FIG. 2B, the voice is transmitted from the third mobile terminal 16C to the management device 12, using the uplink frequency, when the third user 18C speaks the Japanese voice such as "konnichiwa". The management unit 12 performs translation processing on the received voice to translate it into English, the language used by the first and second mobile terminals 16A and 16B. The management unit 12 transmits the Japanese original language voice and the English translated voice to the first and second mobile terminals 16A and 16B using the downlink frequency in different time slots. The first and second mobile terminals 16A and 16B select the time slot in the downlink that uses the translation by English of their own language to play the English translation to output the voice "Hello", which is the English translation of "konnichiwa".

Figure 3:
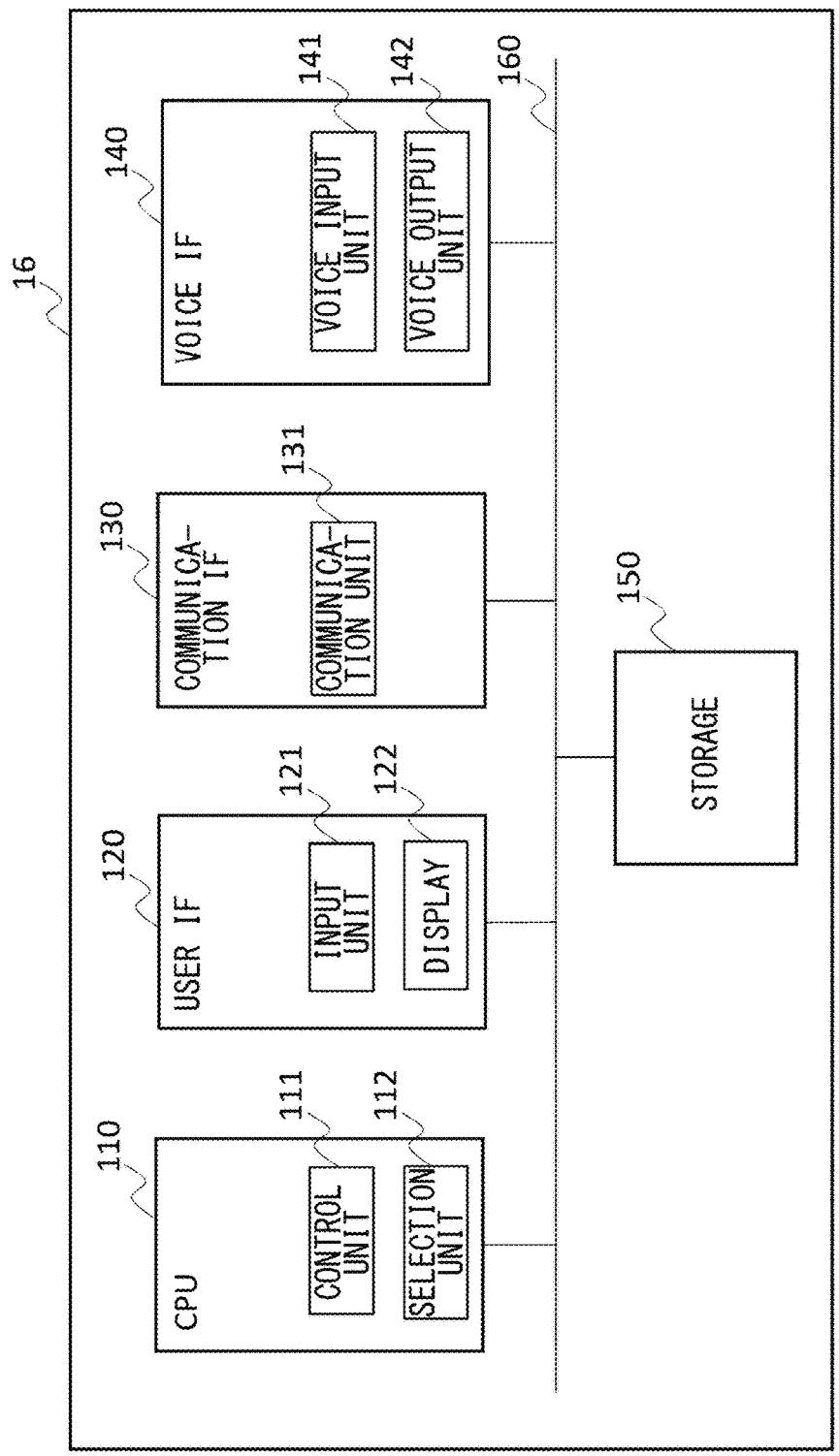
FIG. 3 shows a hardware configuration and functional blocks of a mobile terminal of FIG. 1.

FIG. 3 shows hardware configurations and functional blocks of the mobile terminal 16. The mobile terminal 16 includes a CPU (Central Processing Unit) 110, a user IF (Interface) 120, a communication IF 130, a voice IF 140, and a storage 150. The CPU 110, the user IF 120, the communication IF 130, the voice IF 140, and the storage 150 are connected via a bus 160.

The user IF 120 is for the user 18. The user IF 120 accepts information from the user 18. The user IF 120 presents information to the user 18. The communication IF 130 is connected to the communication network NW to communicate with the relay station 14. Furthermore, the communication IF 130 communicates with the management device 12 via the relay station 14. The storage 150 is a medium for storing information, for example, a hard disk or SSD (Solid State Drive).

The CPU 110 includes a control unit 111 and a selection unit 112. The user IF 120 includes an input unit 121 and a display unit 122. The user IF 120 may include a light emitting device or light emitting unit such as an LED although omitted in FIG. 3. The communication IF 130 includes a communication unit 131. The voice IF 140 is for inputting and outputting call voice. The voice IF 140 includes a voice input unit 141 and a voice output unit 142. The voice input unit 141 is configured by, for example, a microphone. The voice output unit 142 is configured by, for example, a speaker.

The controller 111 performs various controls in the mobile terminal 16. The selection unit 112 selects which of the received original language voice and translation voice is to be used by selecting the time slot using the language pre-set in that mobile terminal 16 based on the slot language information described below.

The input unit 121 includes various buttons for operation by the user 18 of the mobile terminal 16, input devices such as touch panels, and call buttons pressed when transmitting voice. For example, the mobile terminal 16 is in a PTT (Push-to-Talk) ON state for the period of time that the button is kept pressed when the call button is pressed in a PTT OFF state. The PTT OFF state is a receiving state. The PTT ON state is a transmitting state. For example, the mobile terminal 16 returns to the PTT OFF state when the call button is released. Hereafter, the operation in which the call button is pressed to put the PTT ON state is referred to as an ON operation of the PTT. The operation in which the call button is released to put the PTT off state is sometimes referred to as an OFF operation of the PTT. The press state of the call button is detected by the input unit 121 to input to the control unit 111. The display unit 122 is an interface that displays settings and call status of the mobile terminal 16. The display unit 122 is, for example, a display.

The communication unit 131 can communicate with other mobile terminals 16 using a cellular phone system, a professional wireless system, a wireless LAN (Local Area Network) connected to the Internet, etc. The communication unit 131 transmits and receives voice data to and from other mobile terminals 16 using the half-duplex communication method. The communication unit 131 in the present embodiment is an example of a terminal device communication unit.

The voice input unit 141 captures voice based on the speech of the user 18 of the mobile terminal 16 to perform the voice call. The voice output unit 142 outputs voice of the call. The voice output unit 142 outputs the audio signal of the time slot selected by the selection unit 112 as voice.

The storage 150 stores various programs for executing various controls in the control unit 111. The storage 150 stores a mobile terminal name, an individual ID for identifying the mobile terminal 16, a group ID for identifying the group to which the mobile terminal 16 belongs, and a usage language such as Japanese, English, Spanish, etc. information including information on the language used in the mobile terminal 16. The mobile terminal name, individual ID, group ID and language information are set in advance.

Figure 4:
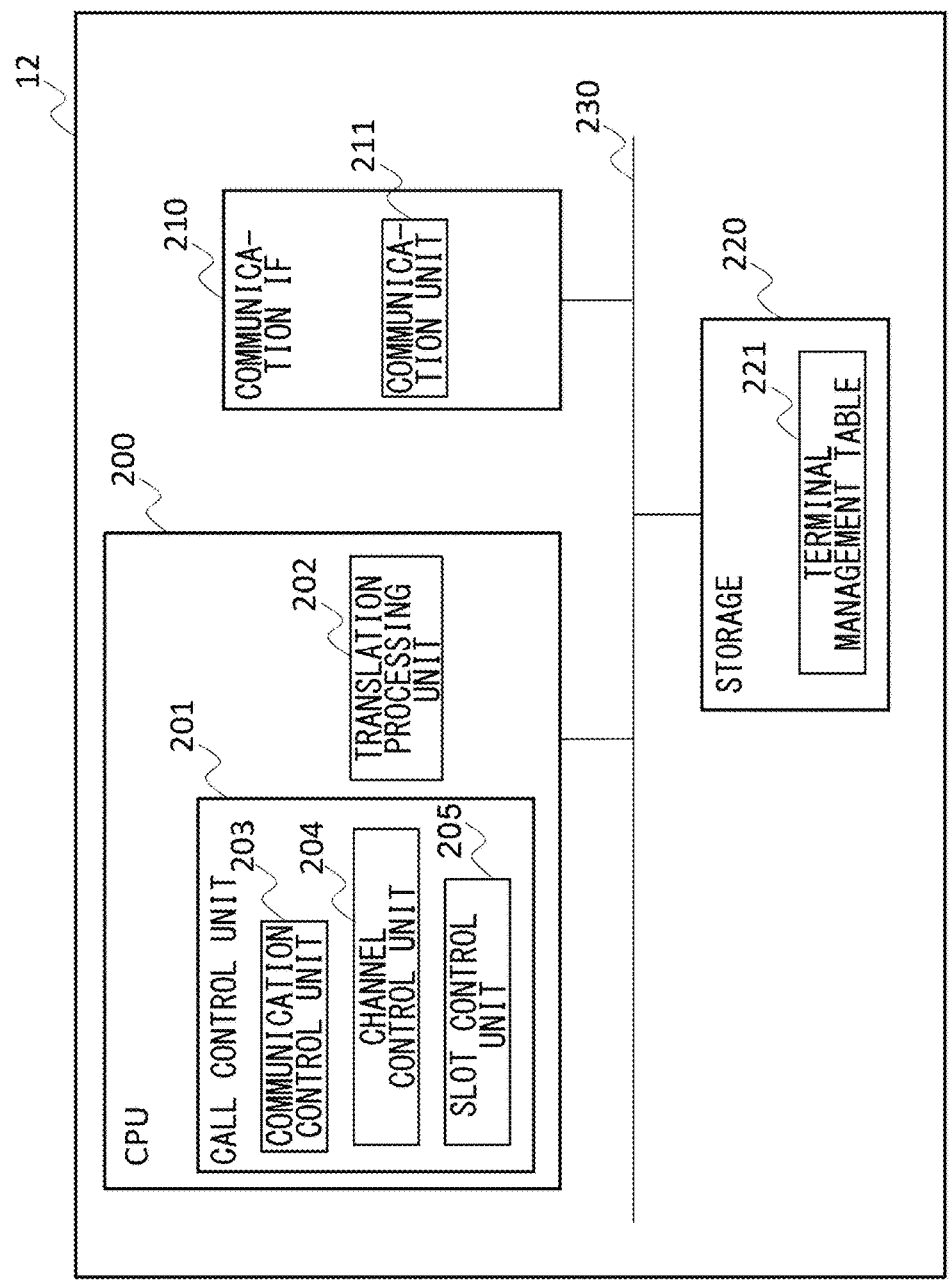
FIG. 4 shows a hardware configuration and functional blocks of a management device shown in FIG. 1.

FIG. 4 shows hardware configurations and functional blocks of the management device 12. The management device 12 includes a CPU 200, a communication IF 210, and a storage 220. The CPU 200, the communication IF 210, and the storage 220 are connected via a bus 230.

The CPU 200 performs processing in the management device 12. The CPU 200 includes a call control unit 201 and a translation processing unit 202. The call control unit 201 includes a communication control unit 203, a channel control unit 204, and a slot control unit 205. The translation processing unit 202 generates translated voice in such a way that the original voice received from one of a plurality of mobile terminals 16 is translated in a language different from the language used for the original voice. The communication control unit 203 performs various controls necessary for communication with the mobile terminals 16 in the half-duplex communication system. The channel control unit 204 performs control processing related to the use of the channel for calls or relay station 14. The slot control unit 205 allocates the original voice and the translation voice to different time slots. The slot control unit 205 allocates the original language voice to the first time slot and the translation voice to the second time slot. The slot control unit 205 also generates slot language information indicating the type of language allocated to each time slot.

The communication IF 210 is connected to the communication network NW to communicate with the relay station 14. In addition, the communication IF 210 communicates with the mobile terminal 16 via the relay station 14. The communication IF 210 includes a communication unit 211 that transmits and receives various data. For example, the communication unit 211 transmits the original language voice in the uplink. The communication unit 211 also performs transmission of the original language voice and the translation voice in the downlink using time slots allocated to each and transmission of the slot language information. The communication unit 211 in the present embodiment is an example of a management device communication unit.

The storage 220 stores various programs for executing various controls and processes in the call control unit 201 and the translation processing unit 202. The storage 220 is a medium for storing information, for example, a hard disk or SSD. The storage 220 includes a terminal management table 221. This terminal management table 221 stores various information about the mobile terminal 16. FIG. 5 shows an example of the terminal management table 221. For example, the terminal management table 151 stores the mobile terminal name, individual ID, group ID, and usage language information for each mobile terminal 16.

Figure 6:
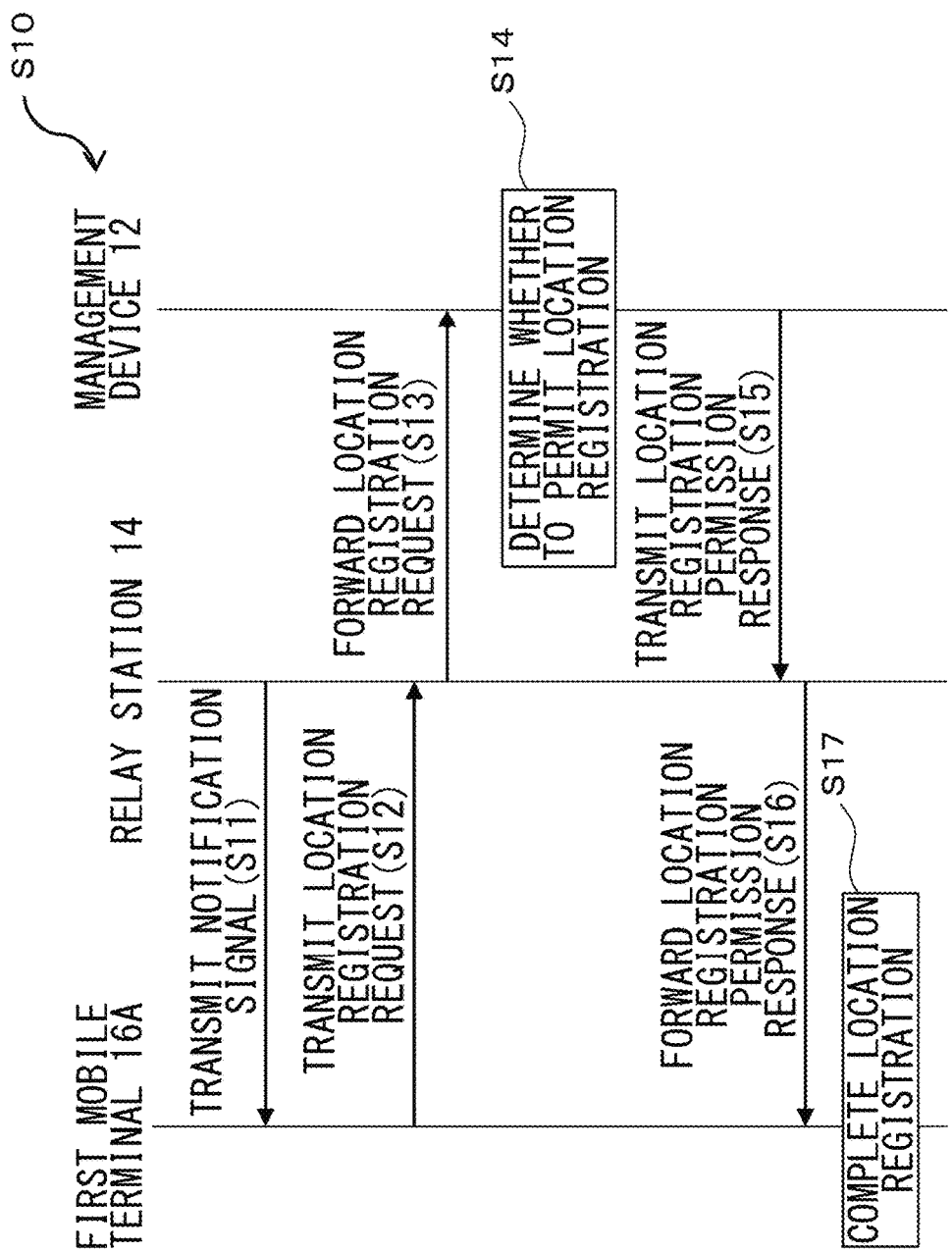
FIG. 6 is a sequence diagram illustrating registration process in the translation communication system.

Next, the sequence processing performed between the mobile terminal 16 and the management device 12 in the present embodiment is described. First, registration processing S10 in the translation communication system 1 is explained using FIG. 6. In this example, the registration processing for the first mobile terminal 16A is described to facilitate the explanation.

The control unit 111 recognizes that the terminal is located within the coverage of the relay station 14 to start the location registration processing, when the communication unit 131 of the first mobile terminal 16A receives a notification signal from the relay station 14 at step S11. The communication unit 131 transmits a location registration request message including the individual ID, group ID and language information of the own terminal to the relay station 14 at step S12. The relay station 14 that receives the location registration request message forwards the received location registration request message to the management device 12 in order to perform a location registration permission determination at step S13.

The communication control unit 203 of the management device 12 determines whether to permit the location registration of the first mobile terminal 16A, i.e., whether to permit communication in its own system by the first mobile terminal 16A at step S14. The communication unit 211 sends a location registration permission response message to the relay station 14 at step S15 if location registration is permitted. At this time, the communication control unit 203 additionally registers the individual ID, group ID and language information used for the first mobile terminal 16A in the storage 220. The relay station 14 that receives the location registration permission response message forwards the location registration permission response message to the first mobile terminal 16A at step S16.

The control unit 111 of the first mobile terminal 16A that receives the location registration permission response message completes the location registration at step S17. This enables calls in the wireless communication system coverage or site. The registration process S10 then ends. By performing the same operation for the second and third mobile terminals 16B and 16C, calls can be made at the same site.

Figure 7:
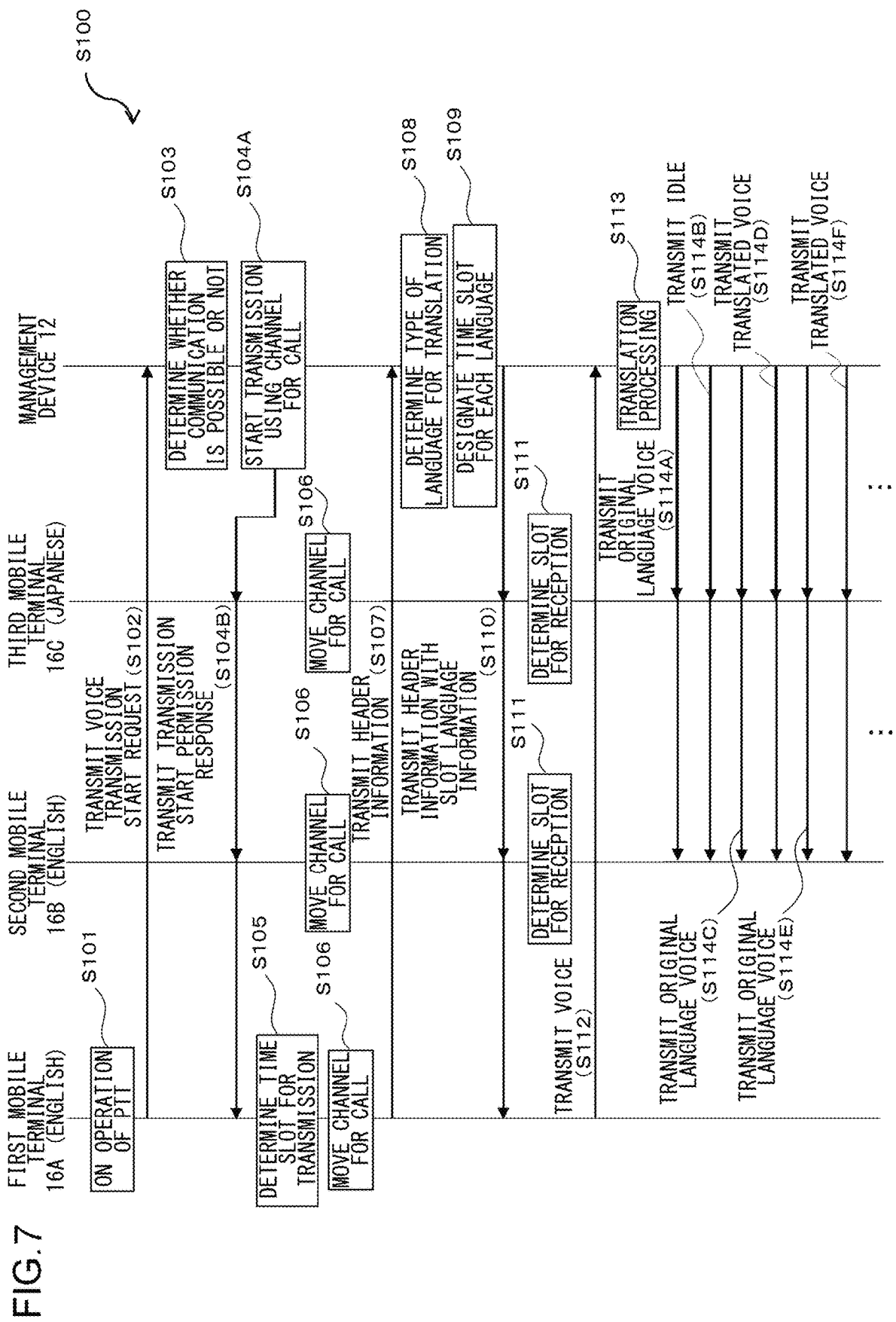
FIG. 7 is a sequence diagram illustrating communication process between mobile terminals when an ON operation of PTT is performed.

Next, FIG. 7 is used to describe communication processing S100 between mobile terminals when the ON operation of the PTT is performed. FIG. 7 shows an example in which the first mobile terminal 16A transmits a speech. In this example, it is assumed that the location registration of the first to third mobile terminals 16A-16C has been completed. The languages used by the first to third mobile terminals 16A-16C are set in the terminal management table 221 in English, English and Japanese, respectively. In this example, the downlink includes the first time slot TSa and the second time slot TSb. The relay station 14 is omitted in FIG. 7 to facilitate the explanation, although communication between each mobile terminal 16 and the management unit 12 is performed via the relay station 14. In the following FIGS. 9, 11, 13, and 14, the relay station 14 is similarly omitted.

The first mobile terminal 16A starts the voice call or the group call, when the first mobile terminal 16A detects the ON operation of the PTT from the input unit 121 at step S101. Next, the communication unit 131 sends a voice transmission start request message including the individual ID and group ID of its own terminal to the management unit 12 to request acquisition of a call channel at step S102.

The communication control unit 203 of the management device 12 that receives the voice transmission start request message determines whether the communication is possible at step S103. The channel control unit 204 starts the transmission with the channel for calls or relay station 14 at step S104A, if the channel control unit 204 permits communication or acquisition of the call channel. At the same time, the communication unit 211 sends a transmission start permission response message to the first mobile terminal 16A and the other mobile terminals 16 i.e., the second and third mobile terminals 16B and 16C waiting with the group ID designated by the first mobile terminal 16A at step S104B. This transmission start permission response message includes an OK message for the voice transmission start request message, the individual ID and group ID of the source mobile terminal 16 or mobile terminal 16A, channel information indicating the calling channel frequency to be used, slot designation information for the uplink for designating the slot for the uplink for transmitting voice over the uplink, and usage language information for each of the mobile terminals 16.

The control unit 111 determines the time slot for the uplink based on the slot designation information for the uplink at step S105, when the control unit 111 of the first mobile terminal 16A receives the transmission start permission response message. Other mobile terminals 16 in the same site that are waiting with the group ID designated by the first mobile terminal 16A recognize that a call request has been sent to their respective terminals, when they receive the transmission start permission response message.

The control unit 111 starts a receiving operation or frequency switching operation for the designated call channel based on the channel information at step S106, when the control unit 111 of each mobile terminal 16 receives the transmission start permission response message. The communication unit 131 of the first mobile terminal 16A starts voice transmission on the designated call channel and time slot to transmit header information at step S107, since the call button is continuously pressed while set to the designated call channel. This header information indicates that this is a message to start voice transmission, and includes the individual ID and group ID of the first mobile terminal 16A of the transmission source.

The translation processing unit 202 of the management unit 12 determines the type of language for translation by referring to information on usage language set in the other mobile terminals 16 using the terminal management table 221 based on the group ID in the header information at step S108. Here, the translation processing unit 202 determines that the translation is in Japanese, the language used by the third mobile terminal 16C. The slot control unit 205 allocates the original voice and the translation voice to different time slots to generate the slot language information indicating the type of language allocated to each time slot based on the result of this determination at step S109. Here, the slot control unit 205 designates the first time slot TSa of the downlink as the time slot for English original language voice and the second time slot TSb as the time slot for Japanese translation voice. The communication unit 211 adds the slot language information to the received header information to transmit this header information to each mobile terminal 16 with the first time slot TSa of the downlink, which is the time slot for the original language voice at step S110. This example shows an example of adding the slot language information to the header information transmitted at the beginning of the transmission, however it is not limited to this. For example, the addition of the slot information is also possible to add the slot language information to an IDLE message as described below that does not include voice data to send it. Furthermore, the time slot in which the slot language information is sent may be other than the time slot for the original voice.

The selection unit 112 of the second and third mobile terminals 16B and 16C check the usage language in each time slot indicated in the slot language information of the header information against the usage language set in their own terminal, when they receive the header information of the first time slot TSa of the downlink, which is the time slot for the original language voice. The selection unit 112 of the second and third mobile terminals 16B and 16C select the time slot using the language that matches the set usage language as the time slot for reception to start the reception operation with the time slot for reception at step S111. The communication unit 131 of the first mobile terminal 16A transmits the English original language voice based on the speech of the first user 18A in FIG. 2A to the management unit 12 with the time slot for uplink at step S112.

The translation processing unit 202 of the management device 12 performs translation processing for translating the received original language voice in the language determined at step S108, at step S113. In the present embodiment, the English original language voice is translated into the Japanese translation voice.

The communication unit 211 transmits voice in each language to the second and third mobile terminals 16B and 16C with separate time slots for each language at step S114. The communication unit 211 performs a repeat or fold back transmission of the English original language voice as it is using the first time slot TSa at step S114A. The voice output unit 142 of the second mobile terminal 16B outputs the English voice by playing back the received original language voice from the first time slot TSa determined as the time slot for reception. On the other hand, the third mobile terminal 16C discards the original language voice received from the first time slot TSa, which is different from the second time slot TSb determined as the time slot for reception.

The translation voice may not yet have been generated immediately after the translation processing begins, since the translation processing described above is time-consuming. In this case, the communication unit 211 transmits an IDLE message without voice data with the second time slot TSb immediately after the start at step S114B. On the other hand, the communication unit 211 transmits the original language voice in English with the first time slot TSa, which is a continuation of step S114A at step S114C. Next, the communication unit 211 transmits the translation voice with the second time slot TSb at step S114D, if the translation process is completed and the translated voice is generated. The voice output unit 142 of the third mobile terminal 16C outputs the Japanese voice by playing the translation voice received from the second time slot TSb. On the other hand, the second mobile terminal 16B discards the translation voice received from the second time slot TSb. Thereafter, the communication unit 211 repeats the transmission of English original language voice and translation voice (at steps S114E, S114F, etc.) using each of the first and second time slot TSa and TSb until the first user 18A finishes the speech and the OFF operation of the PTT is performed. This makes it possible to perform communication for groups using multiple languages on the call channel.

Figure 8:
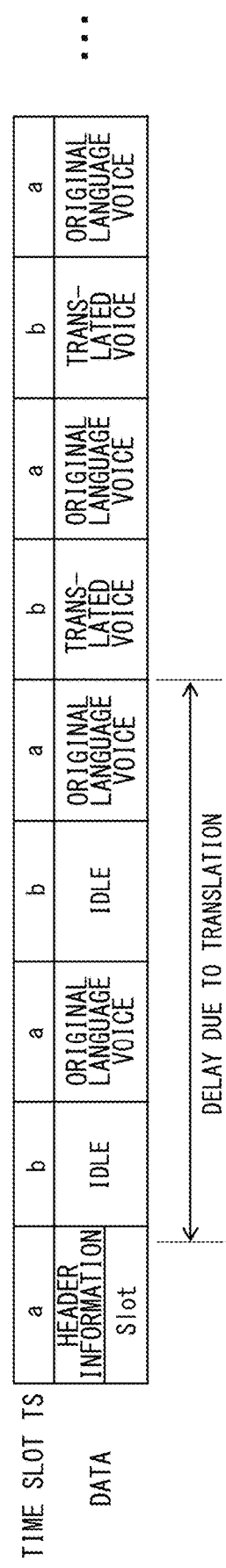
FIG. 8 shows frame data transmitted in a downlink after a transmission of header information.

FIG. 8 illustrates frame data transmitted in the downlink after the transmission of the header information in step S110. The frame data in FIG. 8 includes the first time slot TSa and the second time slot TSb. The frame data in FIG. 8 includes, starting from the beginning of the time slot, the header information and slot language information Slot, IDLE message, original language voice, IDLE message, original language voice, and translation voice (repetition of original language voice and translation voice thereafter) in order. In the example in FIG. 8, the original language voice is placed in the first time slot TSa, the third from the beginning, although the translation voice is placed in the second time slot TSb, the sixth from the beginning, because of the delay of the translation processing. The IDLE messages are placed in the second time slot TSb as in the second time slots TSb of the second and fourth from the beginning, until the translation voice is generated.

Figure 9:
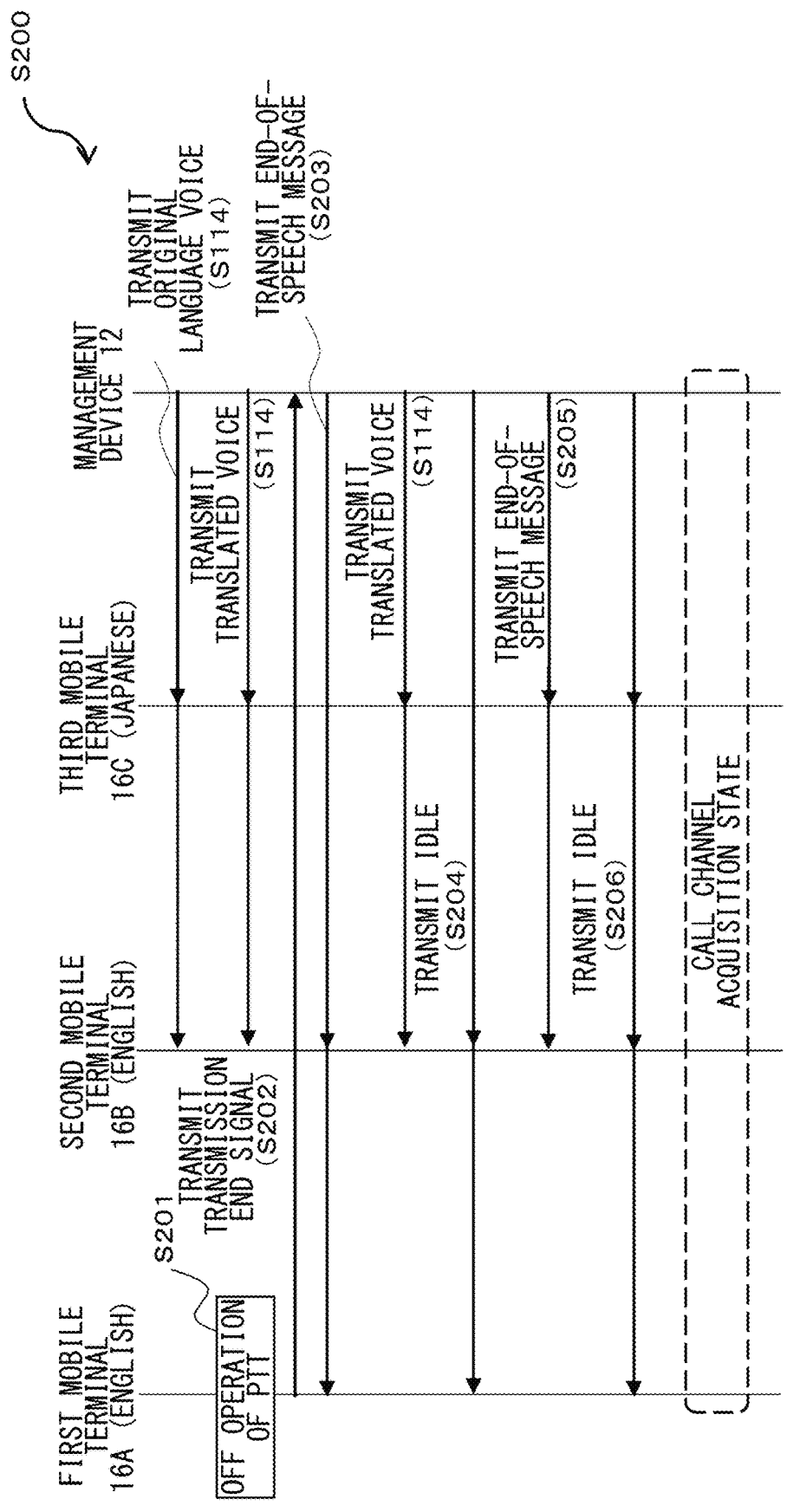
FIG. 9 is a sequence diagram illustrating communication process between mobile terminals when an OFF operation of PTT is performed.

Next, FIG. 9 is used to explain communication processing S200 between mobile terminals when the OFF operation of the PTT is performed. FIG. 9 is assumed to be continued from step S114 of voice transmission in FIG. 7.

The communication unit 131 transmits a transmission end signal to the management device 12 at step S202, when the OFF operation of the PTT of the first mobile terminal 16A is detected from a state in which communication of a group using multiple languages is being performed on the call channel at step S201. The communication unit 211 of the management device 12 firstly transmits an end-of-talk message to notify the end of talk using the first time slot TSa for the original language voice for which voice data transmission has been completed at step S203. The control unit 111 of the second mobile terminal 16B that receives the end-of-speech message judges the end of reception and mutes the speaker. The communication unit 211 continues to transmit the translation voice with the second time slot TSb of the other language at step S114, which follows step S203, if the translation processing to another language or the transmission of the translation voice has not been completed. The communication unit 211 sets the IDLE message in the first time slot TSa to transmit it to the first and second mobile terminals 16A and 16B at step S204, while the transmission of the translation voice is continued.

The communication unit 211 transmits an end-of-talk message with the second time slot TSb for the translation voice at step S205, when the transmission of the translation voice is completed. The control unit 111 of the third mobile terminal 16C that receives the end-of-talk message determines the end of reception and mutes the speaker. This terminates the call in all time slots. After this, a call channel acquisition state is continued for a certain period of time in order to await transmissions by the ON operation of the PTT from each of the mobile terminals 16 using the same frequency continuously. During this time, the communication unit 211 sends the IDLE message to each mobile terminal 16 at step S206. The IDLE message notification state in which calls in all time slots have been completed is a state in which all mobile terminals 16 can start voice transmission or the call channel acquisition state.

Figure 10:
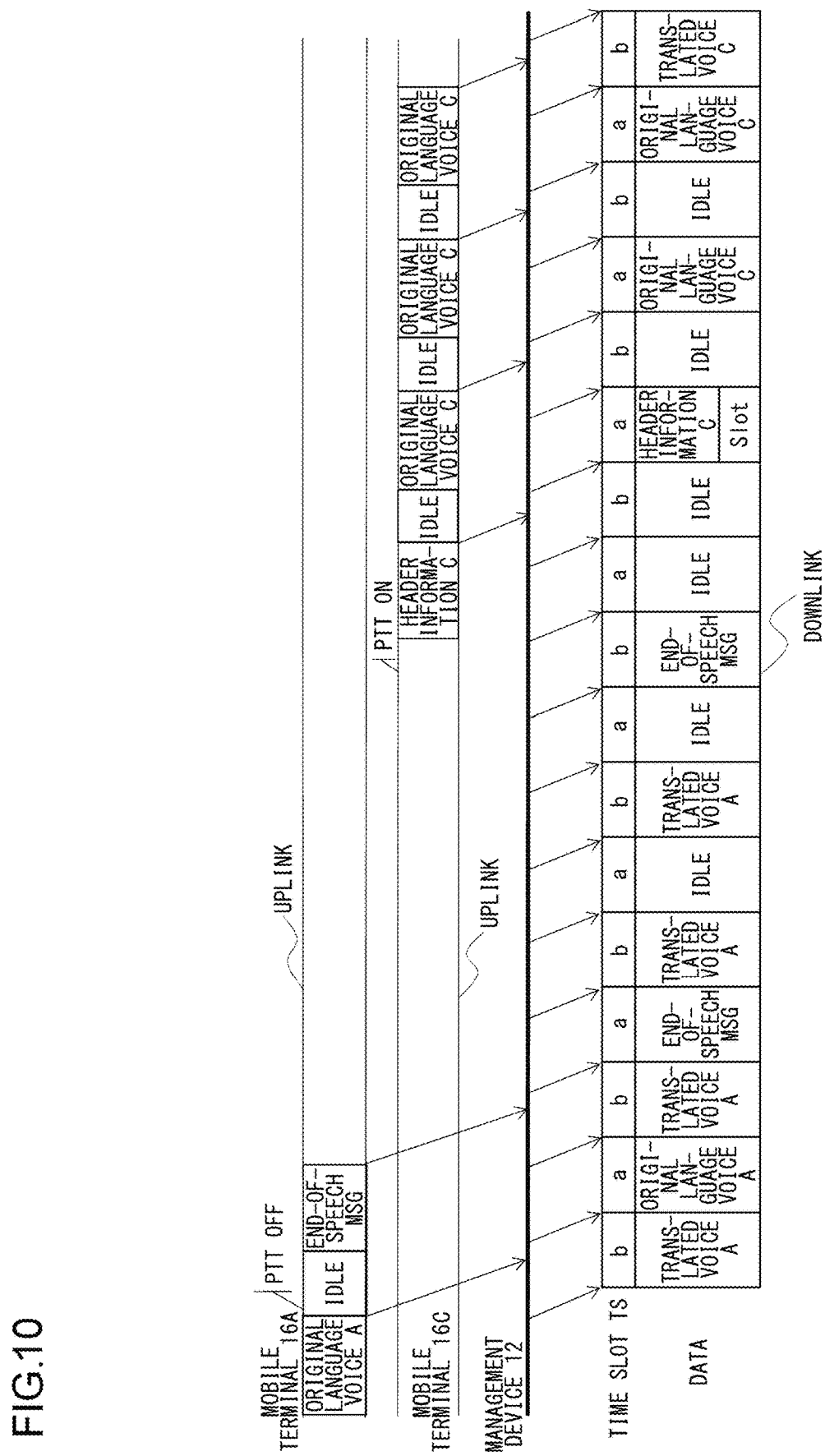
FIG. 10 shows frame data transmitted in the downlink when the OFF operation of the PTT is performed.

FIG. 10 is used to explain an example of frame data transmitted in the downlink when the OFF operation of the PTT is performed in step S201. The first mobile terminal 16A transmits the end-of-talk message or end-of-talk MSG with the uplink, when the OFF operation of the PTT is performed at the first mobile terminal 16A. The management unit 12 transmits the end-of-talk message with the first time slot TSa of the downlink that appears most recently, when the management unit 12 receives the end-of-talk message. Thereafter, the IDLE message is transmitted in the first time slot TSa. In the second time slot TSb of the downlink, the translation voice A is transmitted until the translation processing of the original voice A from the first mobile terminal 16A is completed. The end-of-speech message is transmitted when the translation processing is completed. Thereafter, the IDLE message is transmitted in the second time slot TSb.

Figure 11:
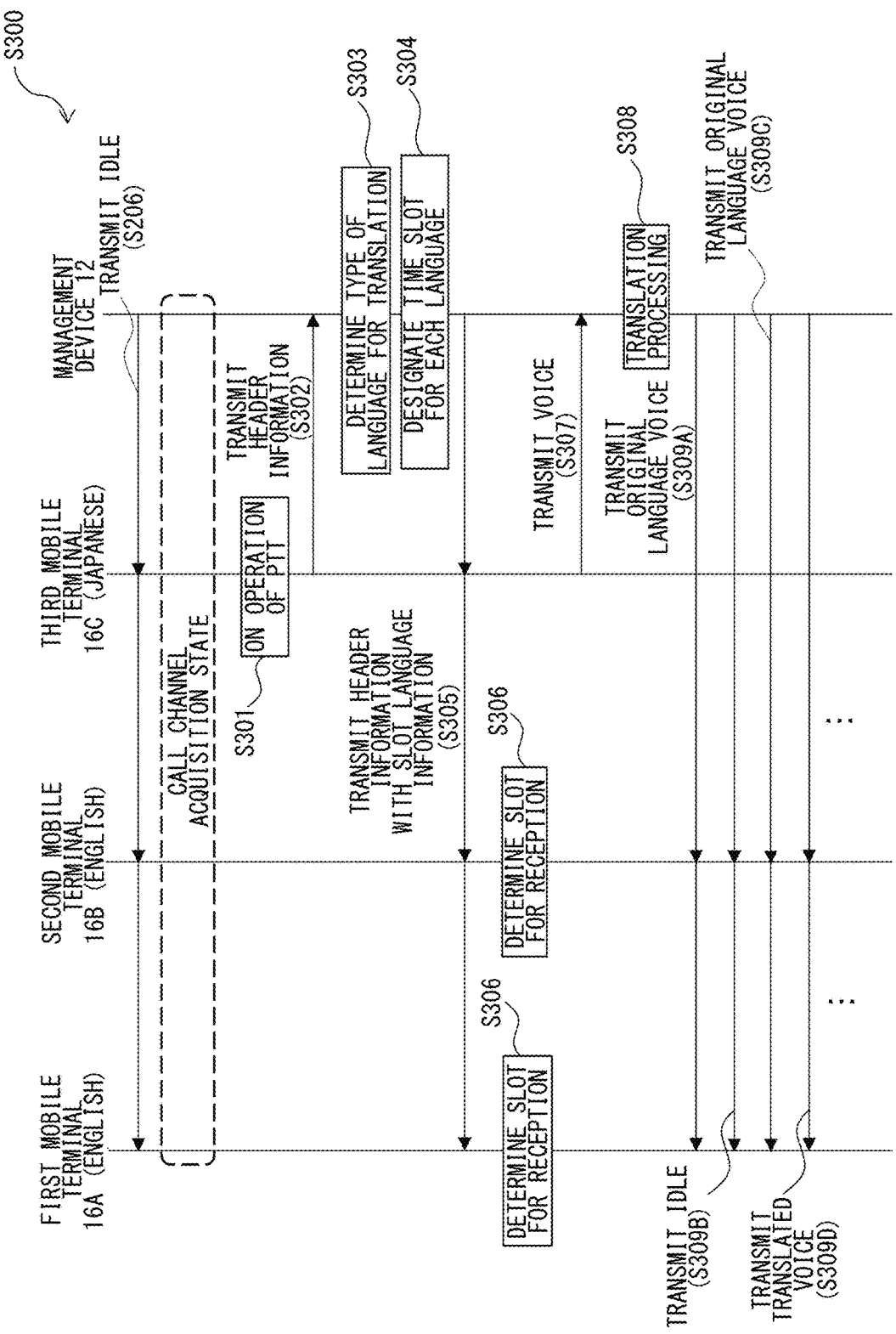
FIG. 11 is a sequence diagram illustrating communication process between mobile terminals when the ON operation of the PTT is performed while a call channel is acquired.

Next, FIG. 11 is used to explain communication processing S300 between mobile terminals when the ON operation of the PTT is performed in the call channel acquisition state. FIG. 11 is assumed to be continued from step S206 of the IDLE message transmission in FIG. 9. Therefore, FIG. 11 starts from a state in which each mobile terminal 16 acquires the call channel. Descriptions of steps S302 to S309 may be omitted, since steps S302 to S309 are basically the same as steps S107 to S114 in FIG. 7 except in points of special mention.

When the third mobile terminal 16C performs the ON operation of the PTT at step S301 during the IDLE message notification at step S206, the communication unit 131 of the third mobile terminal 16C starts voice transmission at step S302, which is a response to the speech of the first mobile terminal 16A. Here, the third mobile terminal 16C uses Japanese, which is a different language from the usage language of the first mobile terminal 16A. In the voice transmission at the third mobile terminal 16C, similar to the voice transmission at the first mobile terminal 16A, the beginning of its transmission data is the header information.

The management unit 12 performs the determination processing of the language for translation at step S303, the designation processing of time slots for each language at step S304, and the transmission processing of the header information with the language information for each time slot at step S305. In step S304, the slot control unit 205 designates the first time slot TSa of the downlink as the time slot for the Japanese original language voice and the second time slot TSb as the time slot for the English translation voice.

The control unit 111 of the first and second mobile terminals 16A and 16B determines the second time slot TSb as the time slot for reception based on the slot language information at step S306. The communication unit 131 of the third mobile terminal 16C transmits the Japanese original language voice based on the speech of the third user 18C in FIG. 2B to the management unit 12 with the time slot for uplink at step S307.

The translation processing unit 202 of the management device 12 performs translation processing to translate the Japanese original language voice into the English translation voice at step S308. The communication unit 211 performs transmission processing of the original language voice and the translation voice at step S309. The communication unit 211 performs the repeat transmission or fold back transmission of the original language voice as it is using the first time slot TSa at steps S309A, C. At this time, both the first and second mobile terminals 16A and 16B select the second time slot TSb as the time slot for reception. Therefore, the first and second mobile terminals 16A and 16B discard the original language voice. The communication unit 211 transmits the IDLE message with the second time slot TSb when the translation processing is not completed at step S309B. The communication unit 211 transmits the translation voice with the second time slot TSb at step S309D, when the translated voice is generated. The voice output unit 142 of the first and second mobile terminals 16A and 16B outputs the English voice by playing the translation voice received from the second time slot TSb. Thereafter, the communication unit 211 repeats the transmission of the original language voice and the translation voice. Thereafter, as described above in FIG. 9, the processing when the OFF operation of the PTT at step S201 is performed by the third mobile terminal 16C is performed, when the third user 18C finishes the speech and the OFF operation of the PTT of the third mobile terminal 16C is performed.

Here, in the voice transmission of FIG. 7, Japanese and English are allocated to the first and second time slots TSa and TSb, respectively. On the other hand, in the voice transmission of FIG. 11, English and Japanese are allocated to the first and second time slots TSa and TSb, respectively. Thus, the languages allocated to the first and second time slots TSa and TSb of the downlink may differ each time the mobile terminal 16 that performs the ON operation of the PTT to speak is switched. However, the slot language information is transmitted to each mobile terminal 16 in steps S110 and S305. This allows the language used in each time slot to be known based on the slot language information. Therefore, each mobile terminal 16 can determine the appropriate time slot for reception without the need to manually switch the time slot for reception.

Referring again to FIG. 10, an example of frame data transmitted in the downlink when the ON operation of the PTT is performed at step S301 is explained. The third mobile terminal 16C transmits its own header information or header information C with the uplink, when the ON operation of the PTT is performed at the third mobile terminal 16C in the call channel acquisition state. Upon receiving the header information C, the management unit 12 determines the time slot to be used for each language. In the call channel acquired state, the management unit 12 determines the first time slot TSa as the time slot for the language voice or the original language voice C of the third mobile terminal 16C, by continuing to use the first time slot TSa for the original language voice, which is previously used for the original language voice A. The management unit 12 transmits the header information C and the slot language information Slot using the first time slot TSa with the downlink. The management device 12 then transmits the original language voice C with the first time slot TSa and the translation voice or the translation voice C with the second time slot TSb, as described above in FIG. 8.

Figure 12:
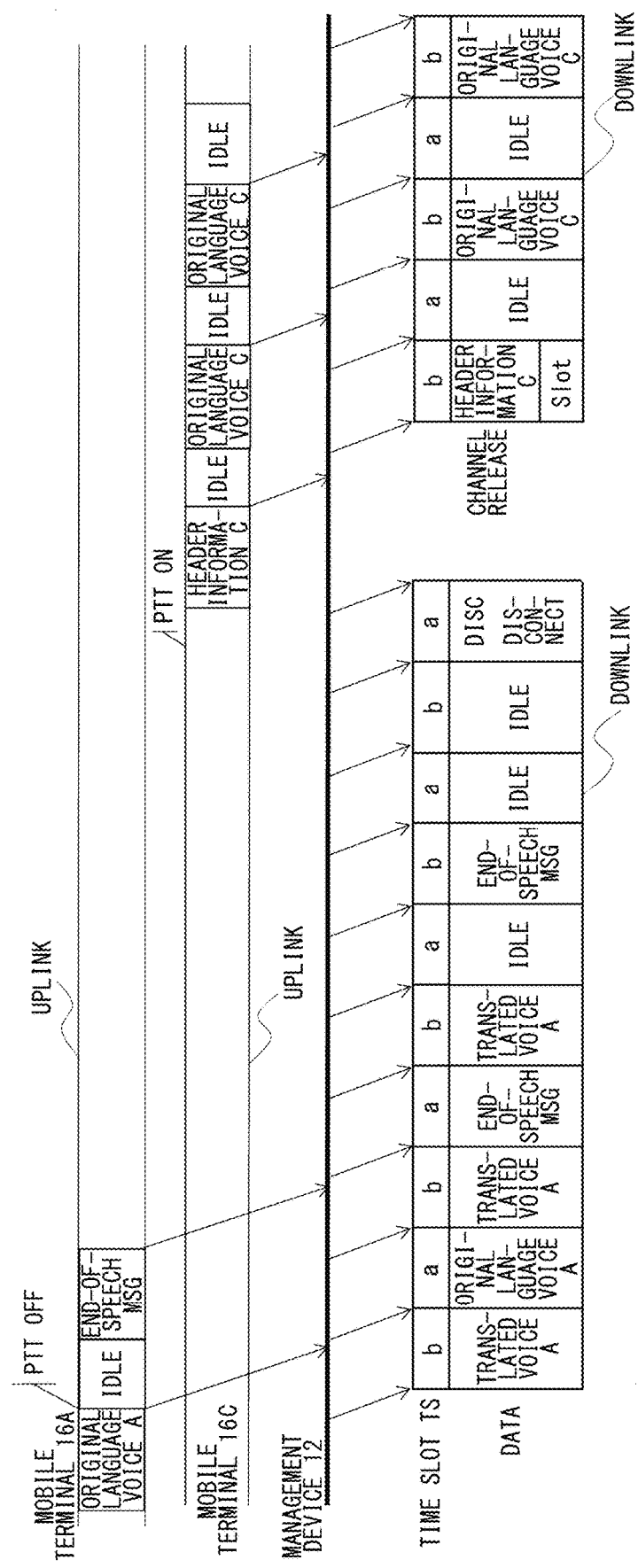
FIG. 12 shows frame data transmitted in the downlink when the ON operation of the PTT is performed while the call channel is released.

Referring to FIG. 12, an example of frame data transmitted in the downlink when the ON operation of the PTT is performed while the call channel is released is explained. The call channel is disconnected and released or channel released, if no call or transmission is made by the ON operation of the PTT by each of the mobile terminals 16 after a predetermined period of time after the end-of-talk message is transmitted to each of the mobile terminals 16. The call channel is re-acquired, if the PTT is then turned on, for example, by the third mobile terminal 16C. In this case, the second time slot TSb, which is previously used for the translation voice, may be switched to the time slot for the original language voice as shown in FIG. 12, depending on the system conditions. Even in such a case, each mobile terminal 16 can check and select the time slot that their own terminal should receive by referring to the slot language information. The same time slot allocation as in the previous communication may continue to be used without switching the time slots for the original language voice and the translation voice even if the calling channel is acquired again. In this case as well, it is possible to select the appropriate time slot by referring to the slot language information.

The operations and effects of the present embodiment are explained. In an inter-group call that receives the original language voice and the translation voice in separate time slots, the language transmitted from the mobile terminal 16 may be switched depending on the caller. In such cases, the time slots of the original language voice and the translation voice may also switch. The user 18 must manually switch time slots in order to output the desired language voice in the mobile terminal 16 of the called side. Therefore, there is an issue that this switching operation is burdensome.

In the present embodiment, the management device 12 transmits the slot language information indicating the type of language allocated to each time slot to the mobile terminal 16. Therefore, the mobile terminal 16 can automatically select the receiving time slot corresponding to the information on the usage language preset in the mobile terminal 16 based on the slot language information. The mobile terminal 16 can output the desired voice from the selected time slot. According to this configuration, it is possible to output the appropriate language voice between the original language voice and the translation voice without the burdensome to manually switch time slots.

In the present embodiment, the communication unit 131 of the mobile terminal 16 transmits the usage language information including information of the usage language set in the mobile terminal 16 to the management unit 12. The translation processing unit 202 determines the type of language for translation based on the language information transmitted from the terminal device 16. According to this configuration, the translation processing unit 202 can easily determine the type of language for translation because the type of language for translation is predetermined.

Second Embodiment

The second embodiment of the invention is described below. In the drawings and description of the second embodiment, the same or equivalent components and parts as in the first embodiment are marked with the same symbols. Explanations that overlap with the first embodiment will be omitted as appropriate, and emphasis will be placed on the configuration that differs from the first embodiment.

The timing of transmission and reception of the translation voice is basically delayed compared to the timing of transmission and reception of the original language voice, since translation of voice data is time-consuming. Therefore, for example, the following disadvantages (1) and (2) are expected to occur. (1) This delayed transmission of the translation voice increases the usage time of the call channel. (2) The timing between the completion of reception and response may be different between the mobile terminal 16 receiving the translation voice and the mobile terminal 16 receiving the original language voice.

In the present embodiment, the translation processing unit 202 speeds up the playback speed of the voice data of the translated language after the transmission of the original language voice is completed, in order to eliminate or reduce the above disadvantages. This makes it possible to reduce the delay until the completion of receiving the translation voice.

Figure 13:
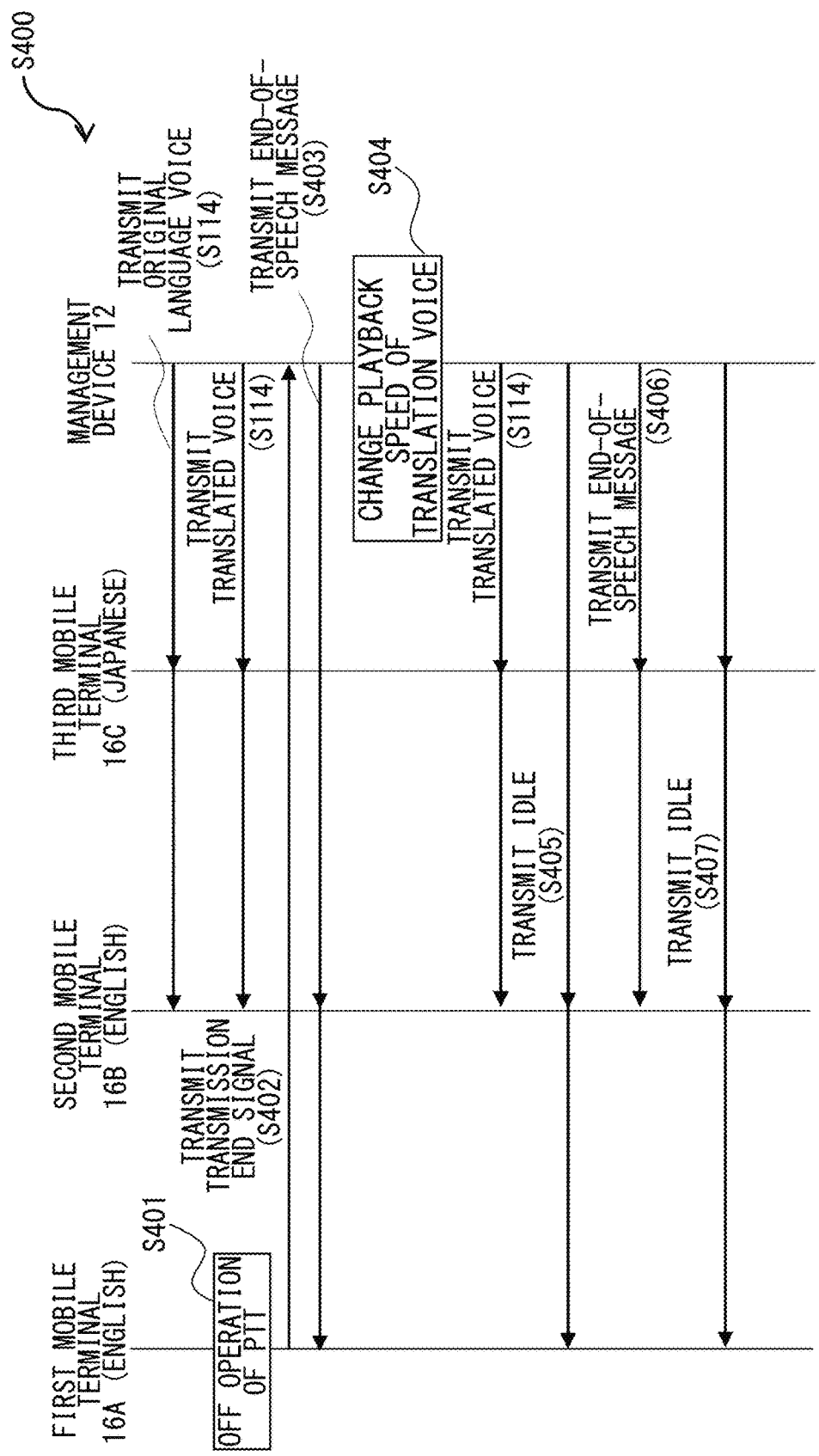
FIG. 13 is a sequence diagram illustrating communication process between mobile terminals in the second embodiment.

FIG. 13 is used to explain communication processing S400 between mobile terminals in the present embodiment. FIG. 13 is assumed to be continued from step S114 of voice transmission in FIG. 7. Descriptions of steps S401-S403 and S405-S407 may be omitted, since steps S401-S403 and S405-S407 are basically the same as steps S201-S203 and S204-S206 in the above FIG. 9 except for the points mentioned in particular.

After steps S401-S403, the translation processing unit 202 of the management device 12 speeds up the playback speed of the translation voice generated in the translation processing faster than the playback speed of the translation voice that has been transmitted before the end of transmission of the original language voice. For example, the translation processing unit 202 speeds up the playback speed of the translation voice to the extent that the callee can hear it. For example, the translation processing unit 202 speeds up the playback speed of the translation voice when the transmission end signal is received at step S402 and the end of transmission of the original language voice is confirmed. To ensure that the increase in playback speed does not make it difficult to understand, the translation processing unit 202 may detect before and after sentences or words to adjust the timing at which the playback speed of the translation voice changes.

Third Embodiment

The third embodiment of the invention is described below. In the drawings and description of the third embodiment, identical or equivalent components and parts to the first embodiment are marked with the same symbols. Explanations that overlap with the first embodiment will be omitted as appropriate, and emphasis will be placed on explanations of configurations that differ from the first embodiment.

As described above, the timing of transmission and reception of the translation voice is basically delayed with respect to the timing of transmission and reception of the original language voice. In addition, the time slot for the original language voice is no longer used after the transmission of the original language voice by the management device 12 is completed. The IDLE messages are transmitted in the time slot for the original language voice. In the present embodiment, the time slot for the original language voice, which is no longer used after the transmission of the original language voice is finished, is effectively utilized. A text message is transmitted instead of the IDLE message using the time slot for the original language voice while the delayed translation voice is being transmitted. The recognition and comprehension of the translated language by the callee can be enhanced by viewing the text message in addition to the translation voice.

The registration processing S10 of the translation communication system 1 in the present embodiment is explained in terms of the differences from the first embodiment. In the present embodiment, a text reception request is added to the location registration request message in step S12 of FIG. 6 for requesting reception of text data after the transmission end signal is received and the transmission of the original language voice is fixed. The management device 12 that receives this text reception request additionally registers the text reception request when notifying the relay station 14 of the location registration permission response message at step S15.

Figure 14:
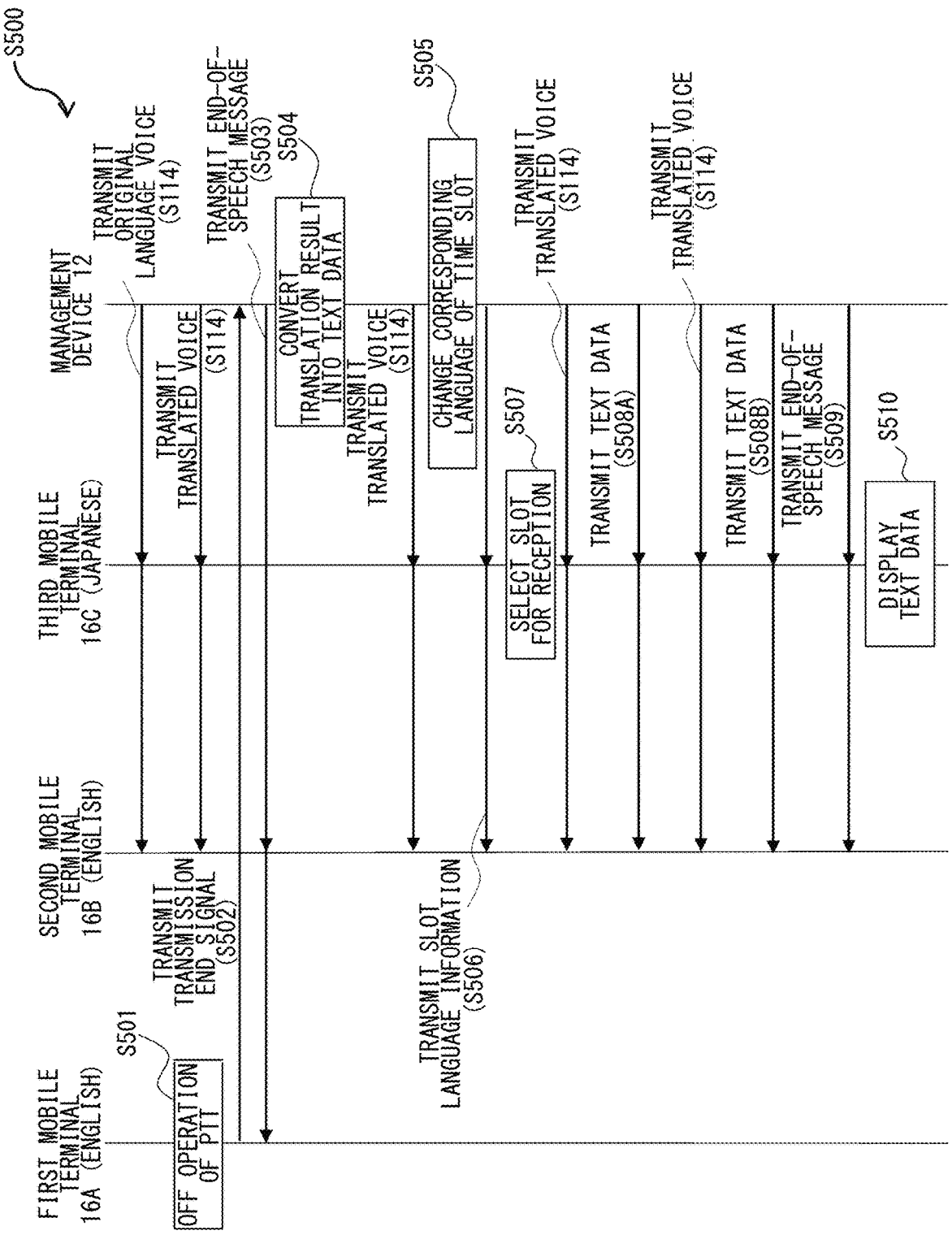
FIG. 14 is a sequence diagram illustrating communication process between mobile terminals in the third embodiment.

FIG. 14 is used to describe communication processing S500 between mobile terminals in the present embodiment. FIG. 14 is assumed to be continued from step S114 of voice transmission in FIG. 7. Descriptions of steps S501-S503 may be omitted, since steps S501-S503 are basically the same as steps S201-S203 in FIG. 9 above except for the points specifically mentioned.

After steps S501-S503, the translation processing unit 202 of the management device 12 converts the translation results into text data at step S504. Here, before the transmission of the end-of-speech message in step S503, the first and second time slots TSa and TSb are in use for the transmission of the original language voice and translation voice, respectively. On the other hand, after the transmission of the end-of-speech message at step S503, only the second time slot TSb for the translated language is in use, and the first time slot TSa is in IDLE state. In the present embodiment, the management device 12 uses this free first time slot TSa to transmit text data in the translated language.

The slot control unit 205 changes the corresponding language of the first time slot TSa by using both the first and second time slots TSa and TSb as time slots for Japanese at step S505. The slot control unit 205 designates the first time slot TSa as the time slot for Japanese text data, and designates the second time slot TSb as the time slot for translation voice or Japanese voice as it is. The slot control unit 205 regenerates the slot language information indicating that both the first and second time slots TSa and TSb are time slots for Japanese. The slot control unit 205 may designate the first time slot TSa as the time slot for translation voice at Japanese voice and the second time slot TSb as the time slot for Japanese text data at step S505, although it is necessary to consider the continuity of voice data. The communication unit 211 transmits this regenerated slot language information with the first time slot TSa at step S506. The control unit 111 of the third mobile terminal 16C that receives this slot language information recognizes that the transmission of the translation voice text data starts with the first time slot TSa.

The selection unit 112 selects both the first and second time slots TSa and TSb as time slots for reception based on the received slot language information at step S507. In other words, the third mobile terminal 16C switches to a receiving operation in two time slots, whereas it has previously received only translation voice in one time slot. The third mobile terminal 16C newly receives text data in the first time slot TSa while continuing to receive the translation voice in the second time slot TSb.

The communication unit 211 transmits the text data with the first time slot TSa at steps S508A and S508B. The communication unit 211 transmits the end-of-speech message at step S509, when the transmission of the translation voice and text data is completed. The display 122 of the third mobile terminal 16C displays the text data at the timing when the reception of all text data is completed at step S510.

Figure 15:
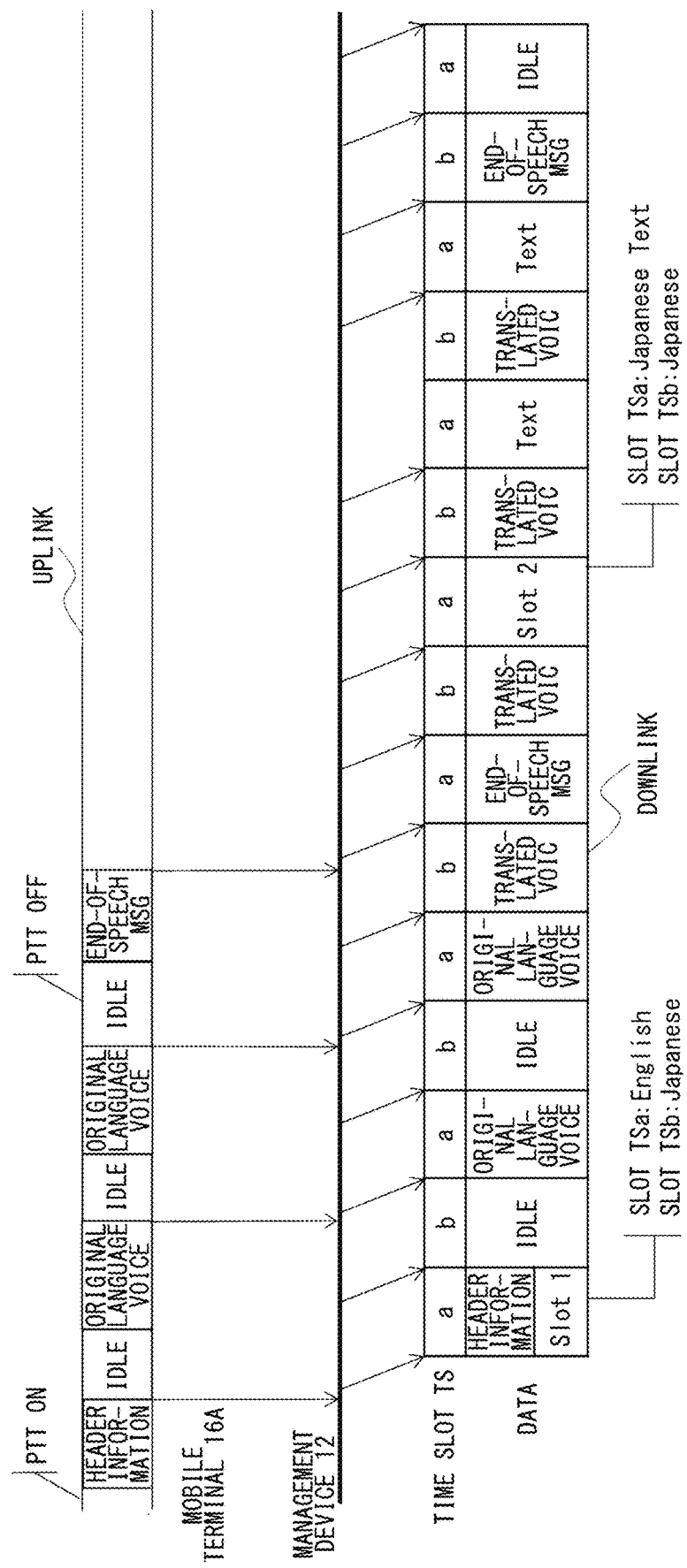
FIG. 15 shows frame data transmitted in the downlink when sending a text message.

Referring to FIG. 15, an example of frame data transmitted in the downlink when transmitting a text message is explained. The slot language information Slot2 is transmitted with the next first time slot TSa, when the OFF operation of the PTT is performed by the first mobile terminal 16A and the end-of-speech message is transmitted in the first time slot TSa. This slot language information Slot2 indicates that the first time slot TSa is for Japanese text and the second time slot TSb is for Japanese voice. The translated language is then transmitted in the second time slot TSb. The text data TEXT is transmitted in the first time slot TSa. The end-of-speech message is transmitted in the second time slot TSb, when the transmission of the text data TEXT in the first time slot TSa is completed. Thereafter, both the first and second time slots TSa and TSb are in the IDLE state.

Thus, in the present embodiment, the following process is performed after the transmission of the original language voice is completed. In other words, the translation processing unit 202 of the management unit 12 generates the text data for the translation voice and also generates the text data from the generated translation voice. The slot control unit 205 regenerates the slot language information that the time slot used for the original language voice is designated as the time slot for the text data. The communication unit 211 transmits the text data and translation voice using different time slots and the regenerated slot language information. According to this configuration, it is possible to increase the recognition and comprehension of the translated language by the user 18 by referring to the text data.

Modification

In the embodiment, the downlink has two time slots, the first time slot and the second time slot, however the downlink is not limited to this. For example, three or more time slots may be used in the downlink.

In the embodiment, voice in two languages, English and Japanese, is communicated in two time slots for downlink, however time slots for downlink are not limited to this. For example, voice in three or more languages may be communicated in three or more downlink time slots.

In the embodiment, the slot language information is communicated in the first time slot TSa, however the time slot for the slot language information is not limited to this. For example, the slot language information may be communicated in the second time slot TSb.

The present invention has been described with reference to the embodiments described above. The invention is not limited to the embodiments described above, but also includes combinations and substitutions of each configuration as appropriate.

What is claimed is:

1. A transmitter comprising:
a translation processing unit configured to generate a translation voice from an original language voice to generate a text data from the generated translation voice;
a slot control unit configured to allocate the original language voice and the translation voice to different time slots to generate a slot language information indicating a type of language allocated to each time slot; and
a communication unit configured to perform a transmission of the original language voice and the translation voice using the time slots allocated to each and a transmission of the slot language information,
wherein the slot control unit regenerates the slot language information that the time slot used for the original language voice is designated as the time slot for the text data, and
wherein the communication unit performs a transmission of the text data and the translation voice using different time slots and a transmission of the regenerated slot language information.

2. The transmitter according to claim 1, wherein the communication unit receives a usage language information including information for a preset usage language, and
wherein the translation processing unit determines the type of language for translation based on the received usage language information.

3. The transmitter according to claim 1, wherein the translation processing unit speeds up a playback speed of the translation voice faster than the playback speed of the translation voice before the end of transmission of the original language voice.

4. A method comprising:
generating a translation voice from an original language voice to generate a text data from the generated translation voice;
allocating the original language voice and the translation voice to different time slots to generate a slot language information indicating a type of language allocated to each time slot;
performing a transmission of the original language voice and the translation voice using the time slots allocated to each and a transmission of the slot language information;
regenerating the slot language information that the time slot used for the original language voice is designated as the time slot for the text data; and
performing a transmission of the text data and the translation voice using different time slots and a transmission of the regenerated slot language information.

5. A receiver comprising:
a storage configured to store information for a preset usage language;
a communication unit configured to receive an original language voice allocated to different time slots, a translation voice of the original language voice, and a slot language information indicating a type of language allocated to each time slot; and a selection unit configured to select the time slot corresponding to the preset usage language information based on the slot language information,
wherein the communication unit receives the text data of the translation voice and the translation voice in different time slots, and receives the slot language information regenerated such that the time slot used for the original language voice is designated as the time slot for the text data of the translation voice, and
wherein the selection unit selects the time slot for the text data and the translation voice based on the regenerated slot language information.

6. The receiver according to claim 5, wherein the communication unit transmits a usage language information including information for a preset usage language.

* * * * *